(12) United States Patent
Agur et al.

(10) Patent No.: US 12,641,398 B2
(45) Date of Patent: May 26, 2026

(54) ENHANCED CHARGING IN CELLULAR COMMUNICATION NETWORKS

(71) Applicant: Nokia Solutions and Networks Oy, Espoo (FI)

(72) Inventors: Eadan Agur, Kfar Sava (IL); Joao Antonio Pereira Rodrigues, Amadora (PT); Maryse Gardella, Vélizy-Villacoublay (FR); Andrew Porter, West Lafayette, IN (US)

(73) Assignee: Nokia Solutions and Networks Oy, Espoo (FI)

( * ) Notice: Subject to any disclaimer, the term of this patent is extended or adjusted under 35 U.S.C. 154(b) by 357 days.

(21) Appl. No.: 18/350,288

(22) Filed: Jul. 11, 2023

(65) Prior Publication Data

US 2024/0031784 A1 Jan. 25, 2024

(30) Foreign Application Priority Data

Jul. 20, 2022 (FI) ..................................... 20225679

(51) Int. Cl.
*H04W 4/24* (2024.01)
*H04M 15/00* (2006.01)

(52) U.S. Cl.
CPC ............. *H04W 4/24* (2013.01); *H04M 15/58* (2013.01)

(58) Field of Classification Search
CPC ....... H04W 4/24; H04M 15/58; H04M 15/31; H04M 15/46; H04M 15/48; H04M 15/59; H04M 15/67; H04M 15/73; H04M 15/76;
H04M 15/785; H04M 15/64; H04M 15/66; H04M 15/82; H04L 12/1403; H04L 9/50; H04L 12/1407; G06Q 20/223
(Continued)

(56) References Cited

U.S. PATENT DOCUMENTS

| | | | |
|---|---|---|---|
| 10,733,201 B1 | 8/2020 | Chen et al. | |
| 2019/0379530 A1 | 12/2019 | Suthar et al. | |

(Continued)

FOREIGN PATENT DOCUMENTS

| | | |
|---|---|---|
| WO | 2022/005351 A1 | 1/2022 |

OTHER PUBLICATIONS

Office action received for corresponding Finnish Patent Application No. 20225679, dated May 7, 2024, 8 pages.
(Continued)

*Primary Examiner* — Huy C Ho
(74) *Attorney, Agent, or Firm* — Tong, Rea, Bentley & Kim, LLC

(57) ABSTRACT

According to an example aspect of the present disclosure, there is provided an apparatus comprising means for receiving, from a service network function, a request related to charging for a user equipment, means for determining whether to defer a consensus-based charging operation associated with the user equipment, means for transmitting to the service network function, when it is determined that the consensus-based charging operation is to be deferred, an indication indicating that the request is granted and means for refraining from transmitting any indication about the consensus-based charging associated with the user equipment until it is determined that the consensus-based charging operation associated with the user equipment is not to be deferred.

15 Claims, 6 Drawing Sheets

(58) Field of Classification Search
USPC ......................................................... 455/406
See application file for complete search history.

(56) References Cited

U.S. PATENT DOCUMENTS

2019/0380031 A1    12/2019  Suthar et al.
2023/0232193 A1*    7/2023  Törnkvist ................ H04L 12/14
                                                          455/406

OTHER PUBLICATIONS

Office action received for corresponding European Patent Application No. 23183615.6, dated Dec. 5, 2024, 7 pages.
"3rd Generation Partnership Project; Technical Specification Group Services and System Aspects; Charging management;\ Study on charging aspects of edge computing (Release 17)", 3GPP TR 28.815, V0.4.0, Feb. 2021, pp. 1-29.
"3rd Generation Partnership Project; Technical Specification Group Services and System Aspects; Telecommunication management; Charging management; Charging architecture and principles (Release 17)", 3GPP TS 32.240, V17.0.0, Dec. 2020, pp. 1-61.
Isaja et al., "Distributed Ledger Technology for Decentralization of Manufacturing Processes", IEEE Industrial Cyber-Physical Systems (ICPS), May 15-18, 2018, 6 pages.
"Catalyst Project", tmforum, Dec. 30, 2019, archived webpage available at: https://web.archive.org/web/20191230043834/https://www.tmforum.org/catalysts/blockchain-unleashed/.
Luo et al., "Edge Computing Integrated with Blockchain Technologies", Complexity and Approximation, Feb. 2020, pp. 1-21.
"TR279 CSP Use Cases Utilizing Blockchain v3.1.1", tmforum, Oct. 4, 2020, archived webpage available at: https://web.archive.

org/web/20201004200831/https://www.tmforum.org/resources/technical-report/tr279-csp-use-cases-utilizing-blockchain-v3-1/.
"Zero-touch network and Service Management (ZSM); Reference Architecture", ETSI GS ZSM 002, V1.1.1, Aug. 2019, pp. 1-80.
Office action received for corresponding Finnish Patent Application No. 20225679, dated Mar. 14, 2023, 13 pages.
"Innovation in Practice: Blockchain in Monetization", Nokia, Jan. 18, 2022, archived webpage available at : https://www.nokia.com/blog/innovation-in-practice-blockchain-in-monetization/.
"5G; Telecommunication management; Charging management; Edge computing domain charging (3GPP TS 32.257 version 17.0.1 Release 17)", ETSI TS 132 257, V17.0.1, Jul. 2022, 67 pages.
"5G; Telecommunication management; Charging management; 5G data connectivity domain charging; Stage 2 (3GPP TS 32.255 version 17.6.0 Release 17)", ETSI TS 132 255, V17.6.0, Jul. 2022, 154 pages.
"5G; Telecommunication management; Charging management; 5G system; Services, operations and procedures of charging using Service Based Interface (SBI) (3GPP TS 32.290 version 17.5.0 Release 17)", ETSI TS 132 290, V17.5.0, Jul. 2022, 43 pages.
Extended European Search Report received for corresponding European Patent Application No. 23183615.6, dated Oct. 26, 2023, 9 pages.
"Introduction of a new key issue and solution", 3GPP TSG-SA5 Meeting #138-e, S5-214085, Agenda: 7.5.1, Nokia, Aug. 23-31, 2021, 5 pages.
"Telecom", Clearx, Jun. 22, 2021, archived webpage available at: https://web.archive.org/web/20210622064107/https://www.clearx.io/telecom.
Communication pursuant to Article 94(3) EPC in corresponding EP Application No. 23 183 615.6-1218, dated Jul. 29, 2025, 6 pages.

* cited by examiner

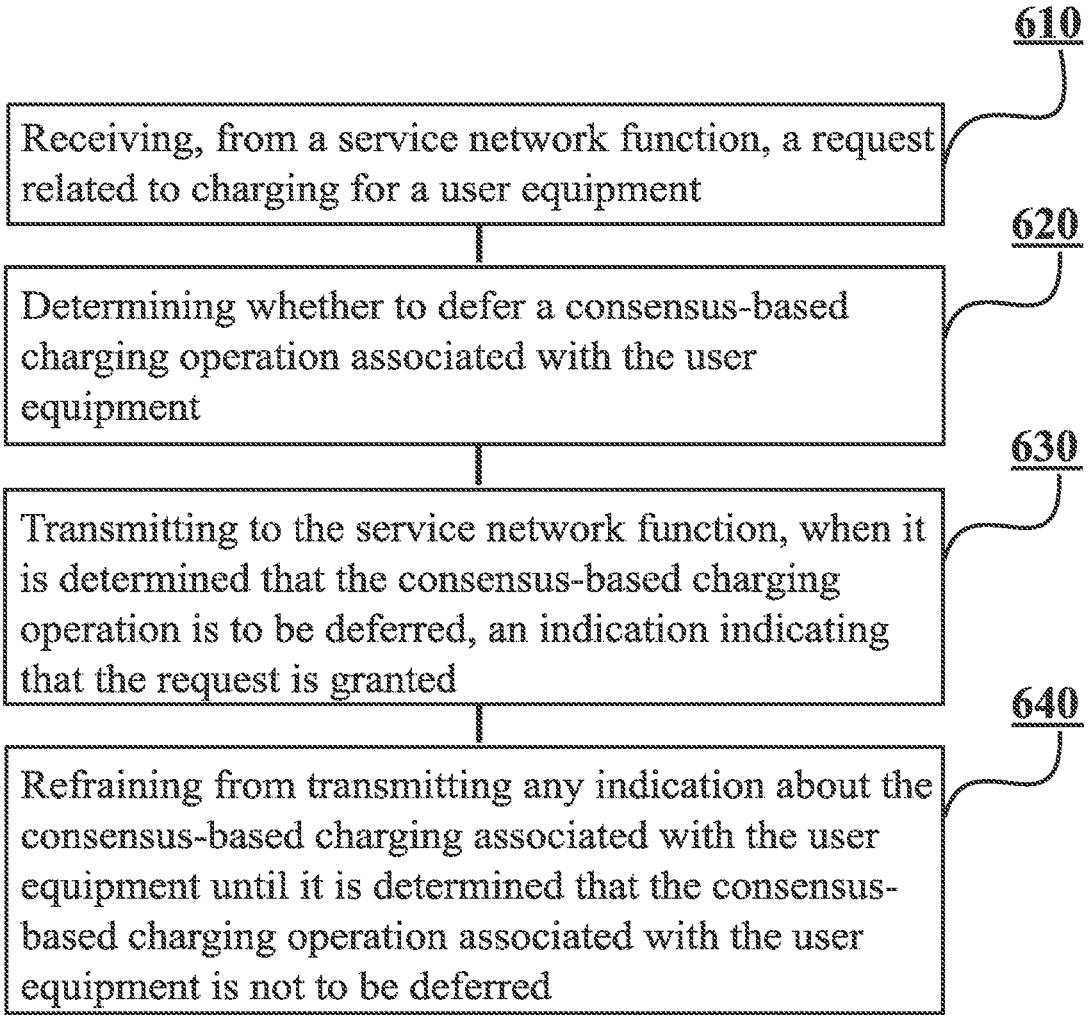

610

Receiving, from a service network function, a request related to charging for a user equipment

620

Determining whether to defer a consensus-based charging operation associated with the user equipment

630

Transmitting to the service network function, when it is determined that the consensus-based charging operation is to be deferred, an indication indicating that the request is granted

640

Refraining from transmitting any indication about the consensus-based charging associated with the user equipment until it is determined that the consensus-based charging operation associated with the user equipment is not to be deferred

FIGURE 6

ENHANCED CHARGING IN CELLULAR COMMUNICATION NETWORKS

FIELD

Various example embodiments relate in general to cellular communication networks and more specifically to charging in such networks.

BACKGROUND

Charging is needed for effective monetization in cellular communication networks. like in 5G networks developed by the 3rd Generation Partnership Project, 3GPP. The 3GPP still develops 5G networks and there is a need to provide improved methods, apparatuses and computer programs for enhancing charging in 5G networks. Such enhancements may be exploited in other cellular communication networks as well. For example, such enhancements may be exploited in 6G networks in the future.

SUMMARY

According to some aspects, there is provided the subject-matter of the independent claims. Some example embodiments are defined in the dependent claims.

The scope of protection sought for various example embodiments of the disclosure is set out by the independent claims. The example embodiments and features, if any, described in this specification that do not fall under the scope of the independent claims are to be interpreted as examples useful for understanding various example embodiments of the disclosure.

According to a first aspect of the present disclosure, there is provided an apparatus comprising means for receiving, from a service network function, a request related to charging for a user equipment, means for determining whether to defer a consensus-based charging operation associated with the user equipment, means for transmitting to the service network function, when it is determined that the consensus-based charging operation is to be deferred, an indication indicating that the request is granted and means for refraining from transmitting any indication about the consensus-based charging associated with the user equipment until it is determined that the consensus-based charging operation associated with the user equipment is not to be deferred.

Example embodiments of the first aspect may comprise at least one feature from the following bulleted list or any combination of the following features:

- wherein said means for determining whether to defer the consensus-based charging operation associated with the request comprises means for determining whether at least one criterion is met;
- wherein said means for determining whether the at least one criterion is met comprises means for comparing a latency requirement of a service or an application of the user equipment to a latency threshold and determining that the consensus-based charging operation is to be deferred when the latency requirement is lower than the latency threshold;
- wherein said means for determining whether the at least one criterion is met comprises means for comparing a quality of experience requirement of a service or an application of the user equipment to a quality threshold and determining that the consensus-based charging operation is to be deferred when the quality of experience requirement is lower than the quality threshold;

the apparatus further comprises means for transmitting to a charging function, when it is determined that the consensus-based charging operation is not to be deferred, an indication about central charging related to the user equipment;

- wherein the indication about central charging is about a new event, and the apparatus further comprises means for receiving from the charging function, responsive to transmitting the indication to the charging function, an indication indicating that a transaction related to the new event is not approved;
- wherein the request related to charging is a request to grant quota and the indication indicating that the request is granted comprises charging information, or the request related to charging is a charging data request and the indication indicating that the request is granted comprises a charging data response.

According to a second aspect, there is provided a method comprising, receiving, from a service network function, a request related to charging for a user equipment, determining whether to defer a consensus-based charging operation associated with the user equipment, transmitting to the service network function, when it is determined that the consensus-based charging operation is to be deferred, an indication indicating that the request is granted and refraining from transmitting any indication about the consensus-based charging associated with the user equipment until it is determined that the consensus-based charging operation associated with the user equipment is not to be deferred.

According to a third aspect of the present disclosure, there is provided an apparatus comprising at least one processing core, at least one memory including computer program code, the at least one memory and the computer program code being configured to, with the at least one processing core, cause the apparatus at least to receive, from a service network function, a request related to charging for a user equipment, determine whether to defer a consensus-based charging operation associated with the user equipment, transmit to the service network function, when it is determined that the consensus-based charging operation is to be deferred, an indication indicating that the request is granted and refrain from transmitting any indication about the consensus-based charging associated with the user equipment until it is determined that the consensus-based charging operation associated with the user equipment is not to be deferred.

According to a fourth aspect of the present disclosure, there is provided a non-transitory computer readable medium having stored thereon a set of computer readable instructions that, when executed by at least one processor, cause an apparatus to at least to perform the method.

According to a fifth aspect of the present disclosure, there is provided a computer program comprising instructions which, when the program is executed by an apparatus, cause the apparatus to carry out the method.

BRIEF DESCRIPTION OF THE DRAWINGS

FIG. 6 illustrates a flow graph of a method in accordance with at least some example embodiments.

EXAMPLE EMBODIMENTS

Charging in cellular communication networks may be enhanced by the procedures described herein. More specifically, a distributed edge infrastructure may be used at least in 5G networks but at the same time requirements related to, for example, latency and quality of experience are strict. Thus, enhancements are needed to make it possible to meet such strict requirements when a distributed edge infrastructure is exploited. Embodiments of the present disclosure enable meeting such requirements by providing a possibility to defer charging in distributed cellular communication networks when at least one criterion, such as a latency or a quality of experience requirement, is not met.

Figure 1:
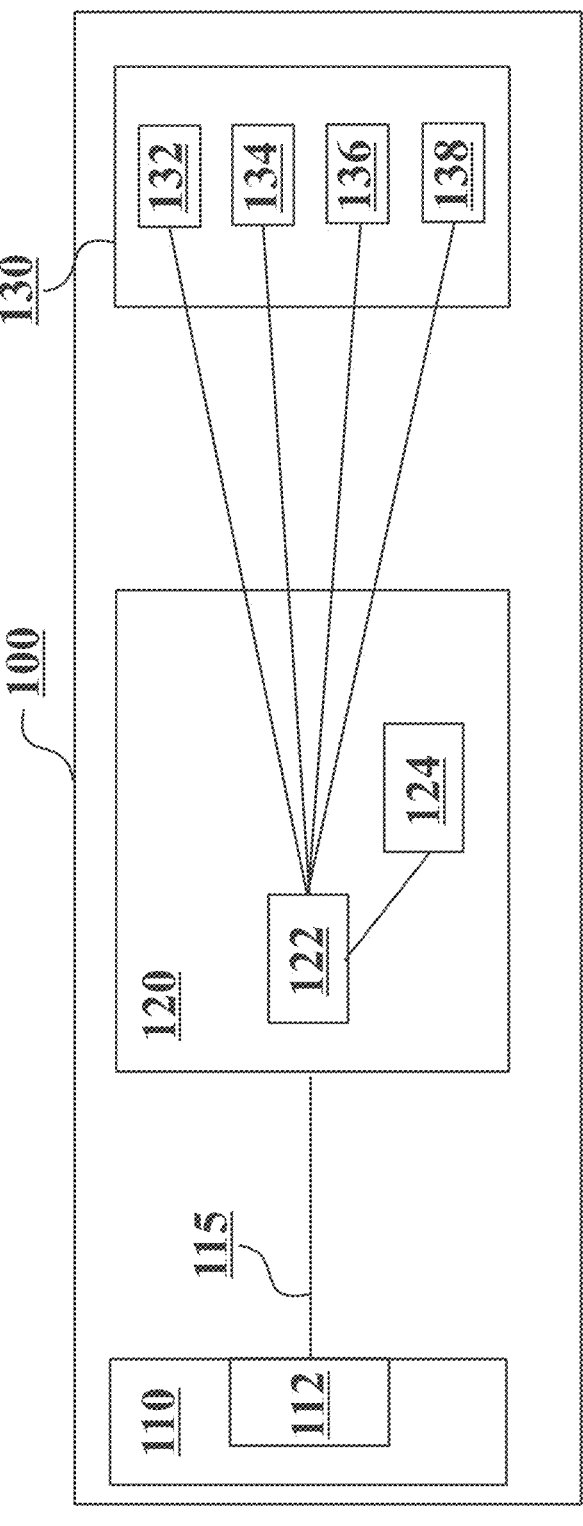
FIG. 1 illustrates an example scenario in accordance with at least some example embodiments.

FIG. 1 illustrates an example scenario in accordance with at least some example embodiments. According to the example scenario of FIG. 1, there may be cellular communication network 100, like a core network. Cellular communication network 100 may comprise edge application server(s) 110 and Charging Trigger Function, CTF 112. Cellular communication network 100 may further comprise edge application charging system(s) 120, wherein edge application charging system(s) 120 may comprise edge Charging Function, eCHF, 122 and edge Rating Function, eRF, function 124. Edge application server(s) 110 and CTF 112 may be connected to eCHF 122 via communication interface 115, like NeCHF.

In addition, cellular communication network 100 may comprise central network part 130, wherein central network part 130 may comprise different network functions, such as Account Balance Management Function, ABMF, 132, Charging Function, CHF, 134, Charging Gateway Function, CGF, 136 and Rating Function, RF, 138. Central network part 130, and network functions therein, may be connected to eCHF 122 via another communication interface. Central network part 130 may be connected to multiple edge application charging systems 120 and functions therein may serve multiple CHFs 122. In some embodiments, network functions may also be referred to as network nodes.

As the demand for edge-based services increases in cellular communication networks, communication providers will need to support high data volumes and low latency capabilities to provide valuable service to their customers using distributed architectures. Distributed architectures of cellular communication networks therefore need to be enhanced, to avoid various challenges in many areas such as security, integrity and synchronization. For instance, synchronization between edge network nodes needs to be ensured as well as synchronization between edge network nodes and center network nodes, because center network nodes also need to continue and process the required events.

For instance, at least some use cases of 5G technology have very strict requirements, such as very low latency (<10 ms), large number of devices/sensors and/or huge amount of data that need to be processed. To fulfil those requirements, there is a need to have a distributed edge infrastructure, to allow a service or an application to be managed as close to an end-user, like a User Equipment, UE, as possible. At the same time the service of experience needs to be continuously monitored, to be able to predict and/or mitigate any possibility of disruption. Furthermore, there is a need to consider having charging capabilities at the edge network nodes for such requirements. In case of a disruption, charging should continue to support the service delivery at the edge network nodes.

Furthermore, a charging transaction may need to be immutable, accountable, auditable, unique and secure. In addition, several other factors may need to be taken into account. For example, in case of 5G, the 5G ecosystem may include components from different vendors. In addition, some use cases, like massive Machine Type Communications, mMTC, and Ultra-Reliable Low Latency Communications, URLLC, demand a strict fulfilment of service and application requirements, such as latency (<1 ms). Also, a transaction may need to be stored and accessed without a single point of failure.

Embodiments of the present disclosure therefore enable both the security and accountability using a distributed ledger, like CHF 134, possibly similar to a ledger in case of blockchains, smart contracts etc., but without compromising the speed required by edge-based applications. More specifically, the problem is how charging can be done at multiple edge network nodes, without service disruption and degradation of service experience of the end-user.

For example, charging capabilities, at eCHF 122 for example, may be instantiated together with a service and/or an application, in order to optimize the edge infrastructure resources. However, once service and/or the application is terminated, the edge infrastructure resources may be allocated for another service/application. The distributed ledger may be used to store all transactions that occur in the ecosystem. Charging may be then performed in real-time or it may be deferred, for example due to very strict latency requirements, e.g., ultra low latency <1 ms. The service and/or the application of the end-user may continue to be consumed, whilst the correspondent transaction is stored on a different window time, by deferring a distributed ledger consensus operation.

Figure 2:
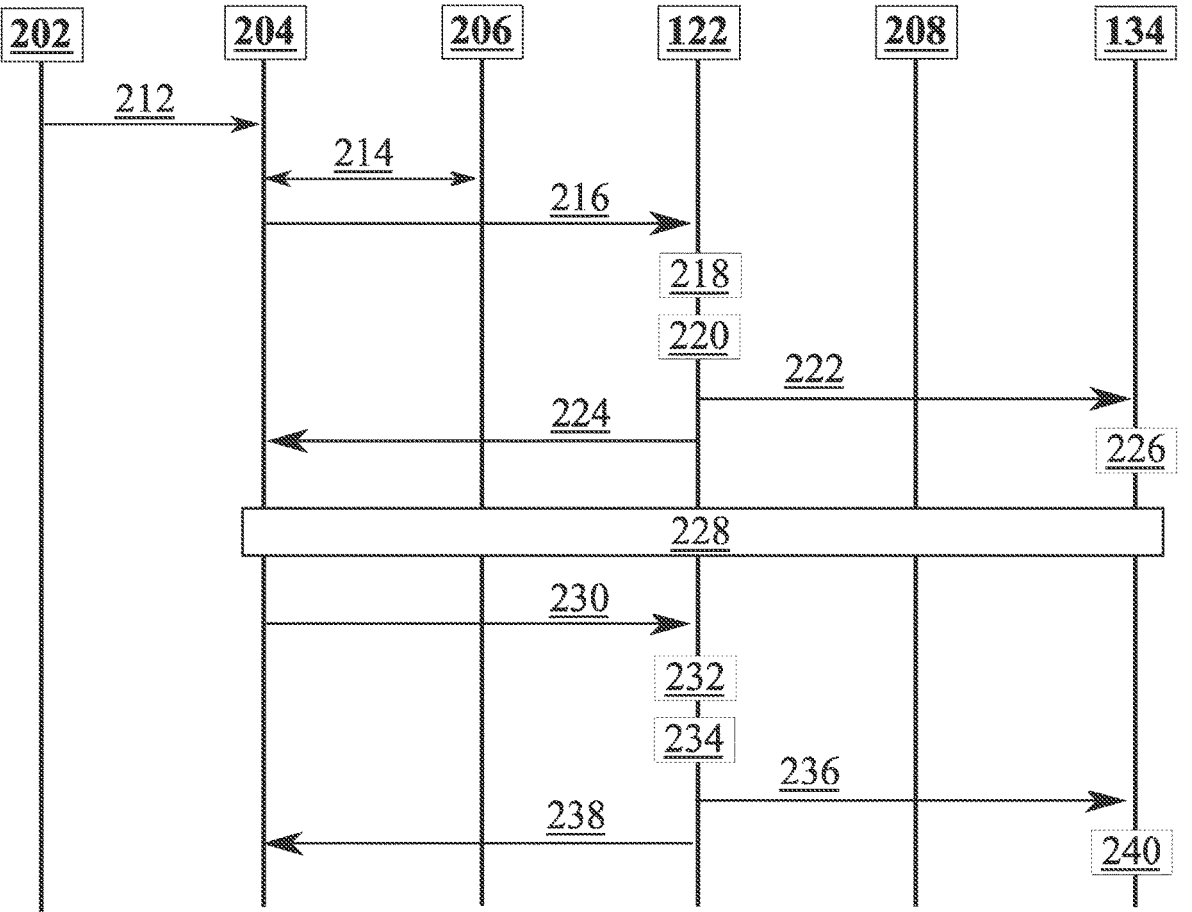
FIG. 2 illustrates a first signalling graph in accordance with at least some example embodiments.

FIG. 2 illustrates a first signalling graph in accordance with at least some example embodiments. In FIG. 2, UE is denoted by 202, service network function is denoted by 204, Policy Control Function, PCF, is denoted by 206, eCHF is denoted by 122 like in FIG. 1, Application Function, AF, is denoted by 208 and CHF is denoted by 136 like in FIG. 1. Service network function 204 may comprise a Session Management Function, SMF, and/or Access and Mobility management Function, AMF. Service network function 204, PCF 206, eCHF 122 and AF 208 may be deployed at the edge of cellular communication network 100, for example.

FIG. 2 illustrates how charging at the edge of cellular communication network 100 may be performed. eCHF 122 may be a new network entity which is linked with the service and/or application delivered. AF 208 may be enhanced in order to cope with the respective flow. eCHF 122 may be deployed at the edge with potentially a dedicated eRF, like eRF 124 in FIG. 1, and central management system (based on architecture shown in FIG. 1). The distributed ledger technology may be used between eCHF 122 and a Converged Charging System, CCS, for charging transactions.

At step 212, UE 202 may start a Protocol Data Unit, PDU, session in order to use applications. UE 202 may be referred to as an end-user, like a service consumer, as well. UE 202 may request, at step 212, a specific service through a portal, wherein the portal may be a presentation layer, i.e., a business plane on top of a management plane, to a allow design and deployment of a service. There may be a setup of a PDU session through SMF supported by service network function 204, like the AMF.

At step 214, service network function 204 may interact with PCF 206 for service policy and charging rules. For instance, service network function 204 may, at step 214, retrieve and check service policy rules and PCF 206 may trigger service policy.

After that, charging setup from service network function 204, like the SMF, may be performed for the PDU session. In this case eCHF 122 may be otherwise the same as CHF 134 (as specified in 3GPP TS 32.240), but available at another location and with limited scope at the ede, and a minimum set of data may be assumed to be available at the edge so that the service can be authorized by eCHF 122 to start. This is to avoid having the full set of functions related to account balance management, rating and charging gateway at the edge of cellular communication network 100, in order to preserve the resources at the edge, which may be quite limited and expensive.

At step 216, service network function 204 may initiate a session and reserve quota. That is, at step 216, service network function 204 may transmit to eCHF 122 a request to grant quota for UE 202. The request to grant quota may be a request related to charging for UE 202.

At step 218, eCHF may check authorization for the quota. The authorisation may refer to consensus, and be about having a general agreement across (at least 51%) all CHF nodes for the ecosystem. Once this is done, then a transaction may be approved and recorded. eCHF 122 may, at an edge network node as a part of a distributed ledger, authorize the PDU session of UE 202 based on available data. UE 202 may be authorized with a preliminary quota for example. At step 220, eCHF 122 may determine whether to defer a consensus-based charging operation associated with the request, i.e., to skip the consensus either due to a decision or an event. Said determination about whether to defer the consensus-based charging operation may be based on at least one criterion defined, e.g., per operator or vendor policy. The policies may comprise for example specific rules linked to the quality of experience, service/application delivery without disruption, ultra low latency requirements, etc.

Thus, said determination about whether to defer a consensus-based charging operation associated with the request may comprise determining whether at least one criterion is met. In the example of FIG. 2, eCHF 122 may determine, at step 220, that at least one criterion is met.

For instance, eCHF 122 may determine whether at least one criterion is met by comparing a latency requirement of a service or an application of UE 202 to a latency threshold and determine that the consensus-based charging operation is to be deferred when the latency requirement is lower than the latency threshold. The latency requirement of the service of UE 202 may be 1 ms and if the latency threshold is 10 ms, eCHF 122 may determine that the consensus-based charging operation is to be deferred, i.e., the at least one criterion is not met.

As another example, eCHF 122 may determine whether at least one criterion is met by comparing a quality of experience requirement of a service or an application of UE 202 to a quality threshold and determine that the consensus-based charging operation is to be deferred when the quality of experience requirement is lower than the quality threshold. The quality of service requirement of the service of UE 202 may comprise for example a maximum packet loss rate requirement, maximum bit rate requirement, guaranteed flow bit rate requirement, UE maximum bit rate requirement and/or packet delay requirement, etc., and eCHF 122 may determine that the consensus-based charging operation is to be deferred, if the at least one criterion is not met.

However, in the example of FIG. 1 eCHF 122 may determine that the consensus-based charging operation is not to be deferred and thus, the consensus-based charging may be performed immediately.

As eCHF 122 may determine that the consensus-based charging operation is not to be deferred, eCHF 122 may transmit, at step 222, an indication about central charging related to UE 202 to CHF 134. The indication about central charging may be about a new event. A CHF module of the converged distributed charging application may also be a part of the distributed ledger acting as a consensus verifier. (e.g., multiple CHF instances deployed in several sites in a standard converged charging deployment. In some embodiments, eventual consensus operation may be then started by CHF 134 for the PDU session authorization transaction.

At step 224, eCHF may also transmit an indication indicating that the request is granted to service network function 204. In the example of FIG. 1, the request transmitted at step 216 is a request to grant quota and the indication indicating that the request is granted may comprise charging information (e.g., about the PDU session, etc.). eCHF 122 may thus accept the PDU session without waiting for the approval of CHF 134 and UE 202 may start using applications without unnecessary delay.

At step 226, CHF 134 may verify validations of eCHF 122 to determine whether to perform charging activities related to an event, and then perform charging activities related to the event (e.g., rating, CDR, etc.). Charging event may be an event as defined for example in 3GPP TS 32.240. CHF module of the converged charging system may check a transaction of eCHF 122 decoupled from a process of eCHF 122 and perform additional charging activities. The validation of the decision of eCHF 122 on the authorization is taking into account the latest consumption and counters, for instance, in a scenario of a group quota where each one of the subscribers is connected to different edges consuming either an application or a service. This would facilitate the charging and not increase delays on the service/application delivery, to avoid affecting subscriber experience, i.e., experience of UE 202.

At step 228, UE 202 may start consuming the service. At step 230, eCHF 122 may receive from service network function 204 another request to grant quota for the user equipment. Said another request may indicate that more quota is needed. At step 232, a quota allocation mechanism between eCHF 122 and service network function 204, such as SMF, may be started while UE 202 is using the service. That is, eCHF 122 may perform, at step 232, processing to allocate quota. Steps 234-240 may correspond to steps 220-226, respectively.

Figure 3:
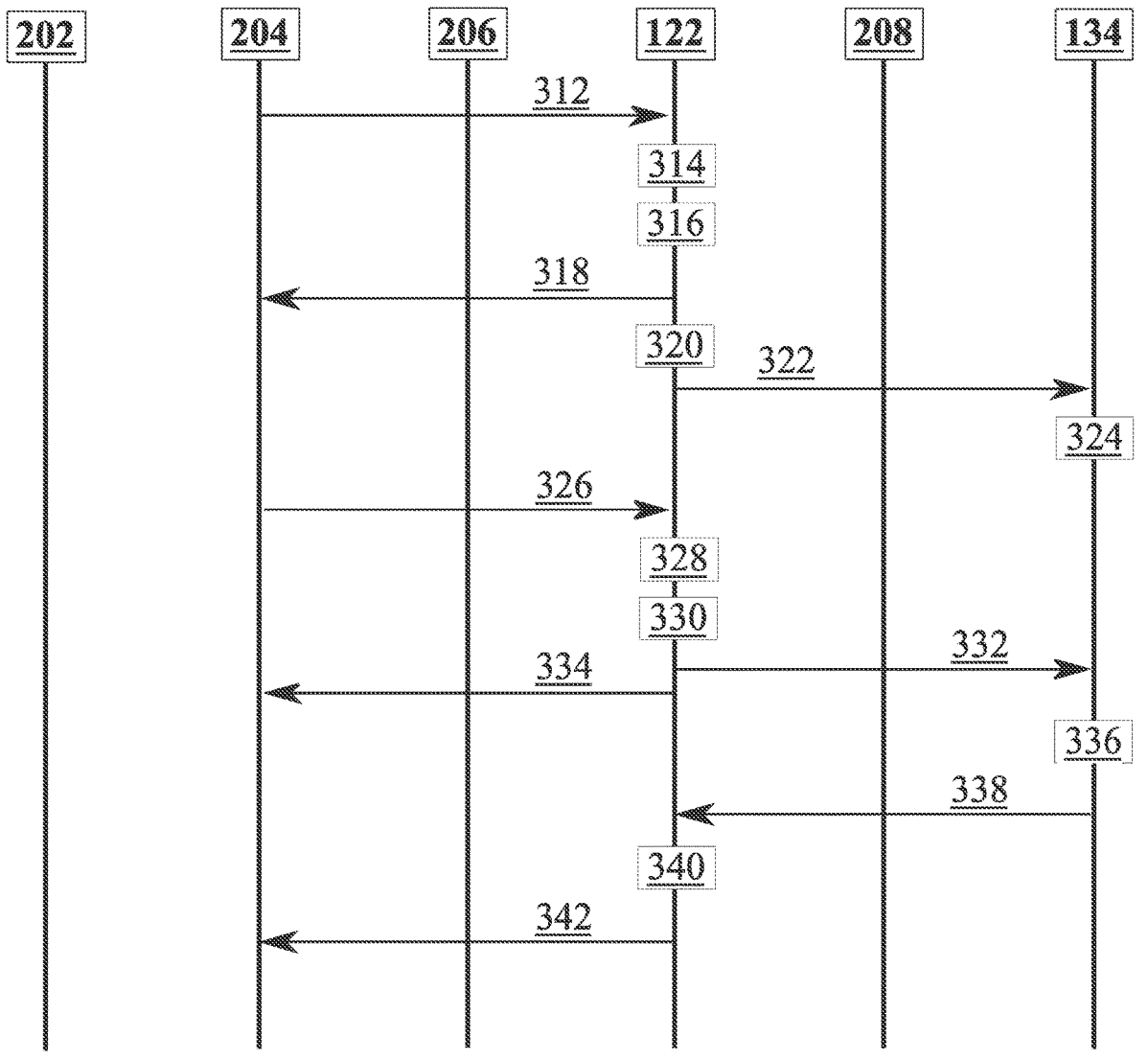
FIG. 3 illustrates a second signalling graph in accordance with at least some example embodiments.

FIG. 3 illustrates a second signalling graph in accordance with at least some example embodiments. As in FIG. 2, in FIG. 3 UE is denoted by 202, service network function is denoted by 204, PCF is denoted by 206, eCHF is denoted by 122, AF is denoted by 208 and CHF is denoted by 136. Steps 312 and 314 may correspond to steps 230 and 232 in FIG. 2, respectively.

At step 316, eCHF may determine whether to defer the consensus-based charging operation in the same way as in steps 220 and 234 in FIG. 3. However, in the example of FIG. 3, eCHF 122 may determine that the consensus-based charging operation is to be deferred. That is, eCHF may determine that the at least one criterion is not met, e.g., by determining that the latency requirement is lower than the latency threshold and/or the quality of experience requirement is lower than the quality threshold. In case of determining that the consensus-based charging operation is to be deferred, the decision may be to defer the distributed ledger consensus operation on quota allocation transaction, to a later stage, determined by at least one criterion defined per operator or vendor policy, e.g., if service/application delivery would be disrupted or ultra low latency would not be guaranteed without deferring the consensus-based charging operation.

As eCHF 122 may determine that the consensus-based charging operation is to be deferred, eCHF 122 may transmit, at step 318, the indication indicating that the request is granted to service network function 204. However, this may be done without transmitting to CHF 134 any indication about the consensus-based charging associated with UE 202, until it is determined that the consensus-based charging operation associated with UE 202 is not to be deferred. That is, eCHF 122 may refrain from transmitting any indication about the consensus-based charging associated with UE 202 to CHF 134 until it is determined that the consensus-based charging operation associated with UE 202 is not to be deferred.

Steps 320, 322 and 324 may then correspond to steps 234, 236 and 240 in FIG. 2, respectively. That is, eCHF 122 may determine, at step 320, that the at least one criterion is met and perform the subsequent actions in the same way. Steps 326-334 may correspond to steps 230-238 in FIG. 2, respectively.

However, CHF 134 may, at step 336, verify eCHF validations and identify that an override is needed (for instance when a shared quota is exhausted). Upon identifying that the override is needed, CHF 134 may transmit to eCHF 122, at step 338, an indication indicating that a transaction, i.e., the event, possibly as defined in 3GPP TS 32.240, is not approved. An updated transaction may be enforced by eCHF 122. That is, eCHF 122 may receive from CHF 134, at step 338, an indication indicating that a transaction related to the new event is not approved, responsive to transmitting the indication about central charging related to UE 202 at step 332. At step 340, eCHF 122 may update, responsive to receiving the indication indicating that the transaction is not approved, counters and re-authorize quota. At step 342, eCHF 122 may transmit a notification about the re-authorization to service network function 204.

Figure 4:
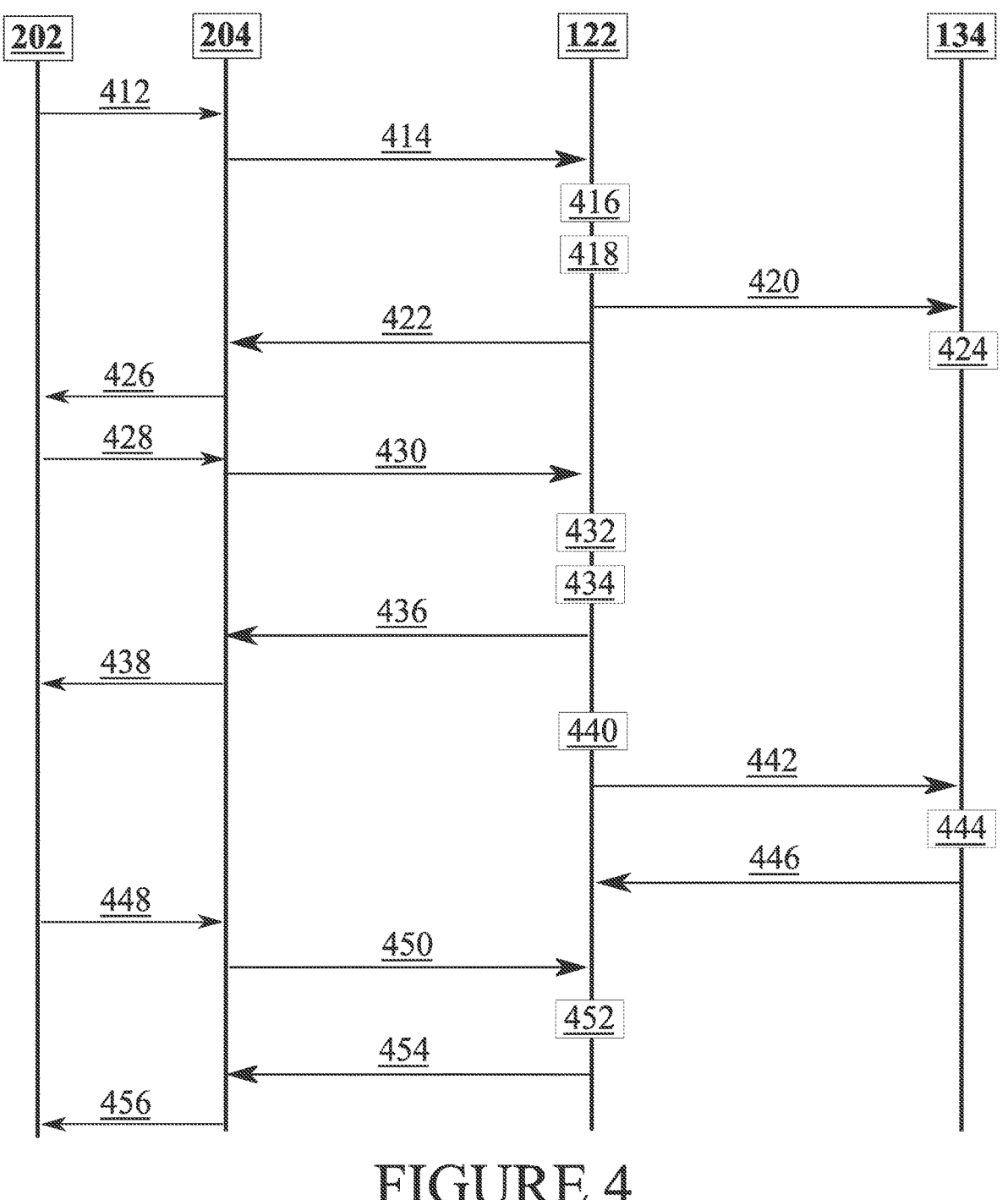
FIG. 4 illustrates a third signalling graph in accordance with at least some example embodiments.

FIG. 4 illustrates a third signalling graph in accordance with at least some example embodiments. As in FIGS. 2 and 3, in FIG. 4 UE is denoted by 202, service network function is denoted by 204, eCHF is denoted by 122 and CHF is denoted by 136. In the example of FIG. 4, service network function 204 may be an SMSF. The third signalling graph may be applied for Short Message Service, SMS, charging at the edge.

At step 412, UE 202 may transmit a first Mobile Originated, MO, SMS submission to service network function 204. Steps 414-424 may then correspond to steps 216-226 in FIG. 2, respectively, but the request related to charging for UE 202 may be a first charging data request and the indication indicating that the request is granted may be a first charging data response. At step 426, network service function 204 may transmit a first MO SMS submission answer to UE 202.

At step 428, UE 202 may transmit a second MO SMS submission to service network function 204. At step 430, service network function 204 may transmit a second request related to charging for UE 202 to eCHF 122, wherein the second request may be a second charging data request and eCHF 122 may check, at step 432, authorization as in step 218. At step 434, eCHF 122 may determine that the consensus-based charging operation is to be deferred, like at step 316 of FIG. 3, and the SMS is to be delivered. At step 436, eCHF 122 may transmit a second charging data response. At step 438, service network function 204 may transmit a second MO SMS submission answer.

Steps 440 and 442 may correspond to steps 330 and 332, respectively. Steps 444 and 446 may correspond to steps 336 and 338, respectively.

At step 448, UE 202 may transmit a third MO SMS submission to service network function 204. At step 450, service network function 204 may transmit a third charging data request to eCHF 122 and eCHF 122 may check, at step 452, authorization. As a result of said checking, eCHF 122 may determine at step 452 that UE 202 is not authorized. At step 454, eCHF 122 may transmit a third charging data response, indicating that the third charging data request is not accepted. At step 456, service network function 204 may transmit a third MO SMS submission answer, wherein the answer indicates that the third submission was rejected.

Embodiments of the present disclosure therefore provide a mechanism to defer the consensus to a later stage, in order to guarantee that a service/application delivery will not be disrupted. The consensus may not be stopped nor halted, but it may be deferred, which would guarantee the correct charging of the respective service and/or application. Thus, charging may take place on multiple edge infrastructures isolated from other edge charging node locations. Low-latency and high volume of transactions may be ensured as well. This may be performed without jeopardising the service provider's revenue as every transaction that is processed at the edge may be verified eventually by CHF 134 acting as the concensus verifier node in the distributed ledger.

An example scenario for which such verification may be required is to support a family shared allowance that consists of few members each with their own devices. It is possible that the allowance will get towards its limit and simultaneously 2 members of the family in different locations, connected to different edges, may request to consume what is left of the allowance. As each eCHF 122 may handle the process in low-latency (sub millisecond), they may both approve the transaction assuming a positive approach. Once the transactions reach CHF 134, those may be re-evaluated by CHF 134. CHF 134 may approve only one of the transaction and another may be overridden. A notification may be sent to a relevant SMF, like SMF 204, using for example a 3GPP interface for re-authorization notification, thereby safeguarding correctness of the family allowance and charges.

Figure 5:
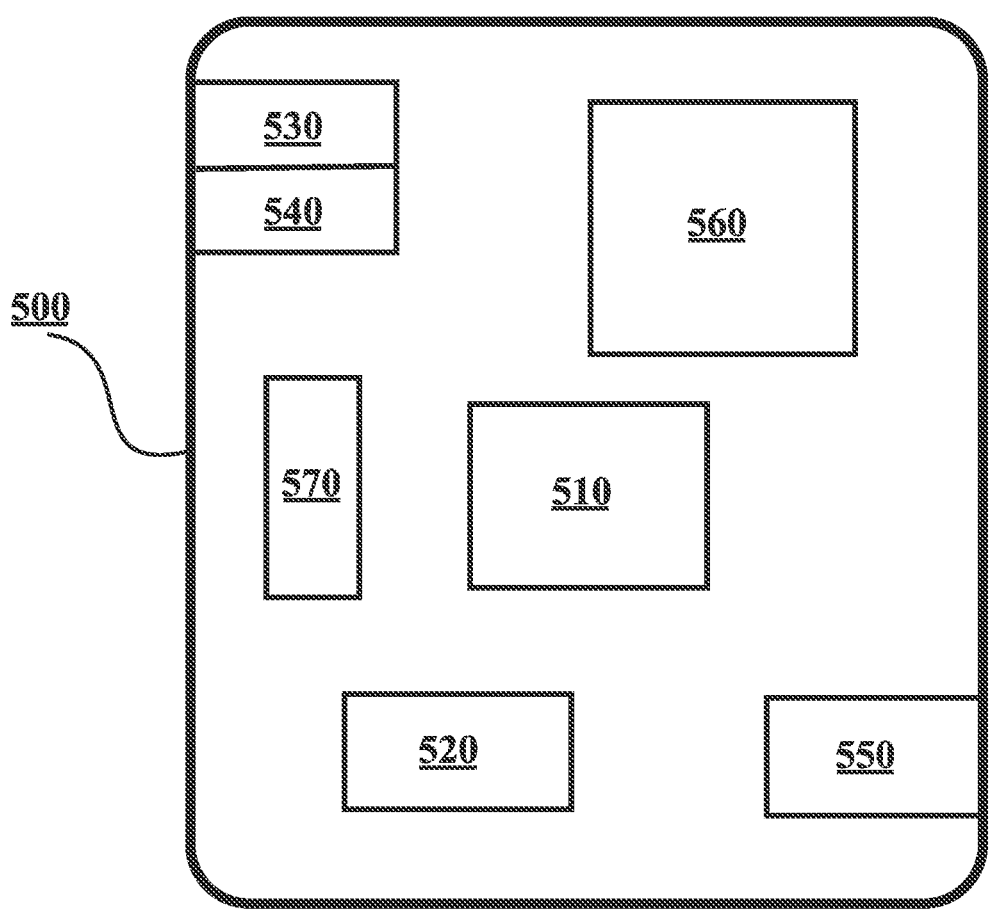
FIG. 5 illustrates an example apparatus capable of supporting at least some example embodiments.

FIG. 5 illustrates an example apparatus capable of supporting at least some example embodiments. Illustrated is device 500, which may comprise, for example, eCHF 122, or a control device configured to control the functioning thereof, possibly when installed therein. Comprised in device 500 is processor 510, which may comprise, for example, a single- or multi-core processor wherein a single-core processor comprises one processing core and a multi-core processor comprises more than one processing core. Processor 510 may comprise, in general, a control device. Processor 510 may comprise more than one processor. Processor 510 may be a control device. A processing core may comprise, for example, a Cortex-A8 processing core manufactured by ARM Holdings or a Steamroller processing core produced by Advanced Micro Devices Corporation. Processor 510 may comprise at least one Qualcomm Snapdragon and/or Intel Atom processor. Processor 510 may comprise at least one application-specific integrated circuit, ASIC. Processor 510 may comprise at least one fieldprogrammable gate array, FPGA. Processor 510 may be means for performing method steps in device 500. Processor 510 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 500 may comprise memory 520. Memory 520 may comprise random-access memory and/or permanent memory. Memory 520 may comprise at least one RAM chip. Memory 520 may comprise solid-state, magnetic, optical and/or holographic memory, for example. Memory 520 may be at least in part accessible to processor 510. Memory 520 may be at least in part comprised in processor 510. Memory 520 may be means for storing information. Memory 520 may comprise computer instructions that processor 510 is configured to execute. When computer instructions configured to cause processor 510 to perform certain actions are stored in memory 520, and device 500 overall is configured to run under the direction of processor 510 using computer instructions from memory 520, processor 510 and/or its at least one processing core may be considered to be configured to perform said certain actions. Memory 520 may be at least in part comprised in processor 510. Memory 520 may be at least in part external to device 500 but accessible to device 500.

Device 500 may comprise a transmitter 530. Device 500 may comprise a receiver 540. Transmitter 530 and receiver 540 may be configured to transmit and receive, respectively, information in accordance with at least one cellular or non-cellular standard. Transmitter 530 may comprise more than one transmitter. Receiver 540 may comprise more than one receiver. Transmitter 530 and/or receiver 540 may be configured to operate in accordance with Global System for Mobile communication, GSM, Wideband Code Division Multiple Access, WCDMA, Long Term Evolution, LTE, and/or 5G/NR standards, for example.

Device 500 may comprise a Near-Field Communication, NFC, transceiver 550. NFC transceiver 550 may support at least one NFC technology, such as Bluetooth, Wibree or similar technologies.

Device 500 may comprise User Interface, UI, 560. UI 560 may comprise at least one of a display, a keyboard, a touchscreen, a vibrator arranged to signal to a user by causing device 500 to vibrate, a speaker and a microphone. A user may be able to operate device 500 via UI 560, for example to accept incoming telephone calls, to originate telephone calls or video calls, to browse the Internet, to manage digital files stored in memory 520 or on a cloud accessible via transmitter 530 and receiver 540, or via NFC transceiver 550, and/or to play games.

Device 500 may comprise or be arranged to accept a user identity module 570. User identity module 570 may comprise, for example, a Subscriber Identity Module, SIM, card installable in device 500. A user identity module 570 may comprise information identifying a subscription of a user of device 500. A user identity module 570 may comprise cryptographic information usable to verify the identity of a user of device 500 and/or to facilitate encryption of communicated information and billing of the user of device 500 for communication effected via device 500.

Processor 510 may be furnished with a transmitter arranged to output information from processor 510, via electrical leads internal to device 500, to other devices comprised in device 500. Such a transmitter may comprise a serial bus transmitter arranged to, for example, output information via at least one electrical lead to memory 520 for storage therein. Alternatively to a serial bus, the transmitter may comprise a parallel bus transmitter. Likewise processor 510 may comprise a receiver arranged to receive information in processor 510, via electrical leads internal to device 500, from other devices comprised in device 500. Such a receiver may comprise a serial bus receiver arranged to, for example, receive information via at least one electrical lead from receiver 540 for processing in processor 510. Alternatively to a serial bus, the receiver may comprise a parallel bus receiver.

Device 500 may comprise further devices not illustrated in FIG. 5. For example, where device 500 comprises a smartphone, it may comprise at least one digital camera. Some devices 500 may comprise a back-facing camera and a front-facing camera, wherein the back-facing camera may be intended for digital photography and the front-facing camera for video telephony. Device 500 may comprise a fingerprint sensor arranged to authenticate, at least in part, a user of device 500. In some example embodiments, device 500 lacks at least one device described above. For example, some devices 500 may lack a NFC transceiver 550 and/or user identity module 570.

Processor 510, memory 520, transmitter 530, receiver 540, NFC transceiver 550, UI 560 and/or user identity module 570 may be interconnected by electrical leads internal to device 500 in a multitude of different ways. For example, each of the aforementioned devices may be separately connected to a master bus internal to device 500, to allow for the devices to exchange information. However, as the skilled person will appreciate, this is only one example and depending on the example embodiment various ways of interconnecting at least two of the aforementioned devices may be selected without departing from the scope of the example embodiments.

FIG. 6 is a flow graph of a first method in accordance with at least some example embodiments. The phases of the illustrated first method may be performed by eCHF 122 or by a control device configured to control the functioning thereof, possibly when installed therein.

The method may comprise, at step 610, receiving, from a service network function, a request related to charging for a user equipment. The method may also comprise, at step 620, determining whether to defer a consensus-based charging operation associated with the user equipment. At step 630, the method may comprise transmitting to the service network function, when it is determined that the consensus-based charging operation is to be deferred, an indication indicating that the request is granted. Finally, the method may comprise, at step 640, refraining from transmitting any indication about the consensus-based charging associated with the user equipment until it is determined that the consensus-based charging operation associated with the user equipment is not to be deferred.

It is to be understood that the example embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an example embodiment, an apparatus, such as, for example, eCHF 122, may comprise means for carrying out the example embodiments described above and any combination thereof.

In an example embodiment, a computer program may be configured to cause a method in accordance with the example embodiments described above and any combination thereof. In an example embodiment, a computer program product, embodied on a non-transitory computer readable medium, may be configured to control a processor to perform a process comprising the example embodiments described above and any combination thereof.

In an example embodiment, an apparatus, such as, for example, eCHF 122, may comprise at least one processor, and at least one memory including computer program code, wherein the at least one memory and the computer program code are configured to, with the at least one processor, cause the apparatus at least to perform the example embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the disclosure. One skilled in the relevant art will recognize, however, that the disclosure can be practiced without one or more of the specific details, or with other methods, components, materials, etc. In other instances, well-known structures, materials, or operations are not shown or described in detail to avoid obscuring aspects of the disclosure.

While the forgoing examples are illustrative of the principles of the example embodiments in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments find industrial application in cellular communication networks.

ACRONYMS LIST

3GPP 3rd Generation Partnership Project
ABMF Account Balance Management Function
AF Application Function
AMF Access and Mobility management Function
CCS Converged Charging System
CGF Charging Gateway Function
CHF Charging Function
CTF Charging Trigger Function
eCHF edge CHF
eRF edge RF
GSM Global System for Mobile communication
mMTC massive Machine Type Communications
MO Mobile Originated
NR New Radio
PCF Policy Control Function
PDU Protocol Data Unit
RF Rating Function
SMF Session Management Function
SMS Short Message Service
SMSF Short Message Service Function
UE User Equipment
UI User Interface
URLLC Ultra-Reliable Low Latency Communications
WCDMA Wideband Code Division Multiple Access
WiMAX Worldwide Interoperability for Microwave Access
WLAN Wireless Local Area Network

REFERENCE SIGNS LIST

| | |
|---|---|
| 100 | Cellular communication network |
| 112 | CTF |
| 115 | Interface |
| 120 | Edge application charging system(s) |
| 122 | eCHF |
| 124 | eRF |
| 130 | Central network part |
| 132 | ABMF |
| 134 | CHF |
| 136 | CGF |
| 138 | RF |
| 202 | UE |
| 204 | Service network function |
| 206 | PCF |
| 208 | AF |
| 212-240 | Steps in FIG. 2 |
| 312-342 | Steps in FIG. 3 |
| 412-456 | Steps in FIG. 4 |
| 500-570 | Structure of the apparatus of FIG. 5 |
| 610-630 | Phases of the method in FIG. 6 |

The invention claimed is:

1. An apparatus, comprising at least one processor, and at least one memory including computer program code, wherein the at least one memory and the computer program code are configured to, with the at least one processor, cause the apparatus at least to:

receive, from a service network function, a request related to charging for a user equipment;

determine whether to defer a consensus-based charging operation associated with the user equipment;

transmit to the service network function, when it is determined that the consensus-based charging operation is to be deferred, an indication indicating that the request is granted; and refrain from transmitting any indication about the consensus-based charging associated with the user equipment until it is determined that the consensus-based charging operation associated with the user equipment is not to be deferred.

2. The apparatus of claim 1, wherein said determining whether to defer the consensus-based charging operation associated with the request comprises determining whether at least one criterion is met.

3. The apparatus of claim 2, wherein said determining whether the at least one criterion is met comprises comparing a latency requirement of a service or an application of the user equipment to a latency threshold and determining that the consensus-based charging operation is to be deferred when the latency requirement is lower than the latency threshold.

4. The apparatus of claim 2, wherein said determining whether the at least one criterion is met comprises comparing a quality of experience requirement of a service or an application of the user equipment to a quality threshold and determining that the consensus-based charging operation is to be deferred when the quality of experience requirement is lower than the quality threshold.

5. The apparatus of claim 1, wherein the at least one memory and the computer program code are further configured to, with the at least one processor, further cause the apparatus to:

transmit to a charging function, when it is determined that the consensus-based charging operation is not to be deferred, an indication about central charging related to the user equipment.

6. The apparatus of claim 5, wherein the indication about central charging is about a new event, and the at least one memory and the computer program code are further configured to, with the at least one processor, further cause the apparatus to:

receive from the charging function, responsive to transmitting the indication to the charging function, an indication indicating that a transaction related to the new event is not approved.

7. The apparatus of claim 1, wherein the request related to charging is a request to grant quota and the indication indicating that the request is granted comprises charging information, or the request related to charging is a charging data request and the indication indicating that the request is granted comprises a charging data response.

8. A method, comprising:

receiving, from a service network function, a request related to charging for a user equipment;

determining whether to defer a consensus-based charging operation associated with the user equipment;

transmitting to the service network function, when it is determined that the consensus-based charging operation is to be deferred, an indication indicating that the request is granted; and refraining from transmitting any indication about the consensus-based charging associated with the user equipment until it is determined that the consensus-based charging operation associated with the user equipment is not to be deferred.

9. The method of claim 8, wherein said determining whether to defer the consensus-based charging operation associated with the request comprises determining whether at least one criterion is met.

10. The method of claim 9, wherein said determining whether the at least one criterion is met comprises comparing a latency requirement of a service or an application of the user equipment to a latency threshold and determining that the consensus-based charging operation is to be deferred when the latency requirement is lower than the latency threshold.

11. The method of claim 9, wherein said determining whether the at least one criterion is met comprises comparing a quality of experience requirement of a service or an application of the user equipment to a quality threshold and determining that the consensus-based charging operation is to be deferred when the quality of experience requirement is lower than the quality threshold.

12. The method of claim 8, further comprising:

transmitting to a charging function, when it is determined that the consensus-based charging operation is not to be deferred, an indication about central charging related to the user equipment.

13. The method of claim 12, wherein the indication about central charging is about a new event, and the method further comprises:

receiving from the charging function, responsive to transmitting the indication to the charging function, an indication indicating that a transaction related to the new event is not approved.

14. The method of claim 8, wherein the request related to charging is a request to grant quota and the indication indicating that the request is granted comprises charging information, or the request related to charging is a charging data request and the indication indicating that the request is granted comprises a charging data response.

15. A non-transitory computer readable medium having stored thereon a set of computer readable instructions that, when executed by at least one processor, cause the apparatus to:

receive, from a service network function, a request related to charging for a user equipment;

determine whether to defer a consensus-based charging operation associated with the user equipment;

transmit to the service network function, when it is determined that the consensus-based charging operation is to be deferred, an indication indicating that the request is granted; and refrain from transmitting any indication about the consensus-based charging associated with the user equipment until it is determined that the consensus-based charging operation associated with the user equipment is not to be deferred.

\*    \*    \*    \*    \*